Dec. 29, 1931.  C. H. TAYLOR ET AL  1,838,880

BRAKE

Filed Dec. 12, 1928

INVENTOR.
CECIL H. TAYLOR
LUDGER E. LaBRIE
BY
ATTORNEY

Patented Dec. 29, 1931

1,838,880

UNITED STATES PATENT OFFICE

CECIL H. TAYLOR AND LUDGER E. LA BRIE, OF SOUTH BEND, INDIANA, ASSIGNORS TO BENDIX BRAKE COMPANY, OF SOUTH BEND, INDIANA, A CORPORATION OF ILLINOIS

BRAKE

Application filed December 12, 1928. Serial No. 325,458.

This invention relates to brakes and is illustrated as embodied in an automotive brake of the internal expanding type wherein the anchorage shifts in either one of two directions depending upon the direction of movement of the revolving drum.

An object of the invention is the provision of a novel anchor abutment adapted to take the braking torque and in the embodiment illustrated there is provided a cup-shaped stamping constructed and arranged to telescope over a correspondingly shaped embossed portion on the brake backing plate. The stamping and embossment are further shaped to serve as a bearing for the crank shaft of the brake-operating mechanism.

Further features of the invention relate to a novel toggle construction and the connection of the thrust links thereof with the end of the friction means; to a novel brake shoe construction adapted to co-operate with the anchor stamping and toggle links; and to other novel and desirable constructions which will be apparent from the following description of the illustrative embodiment shown in the accompanying drawings, in which.

Figure 1:
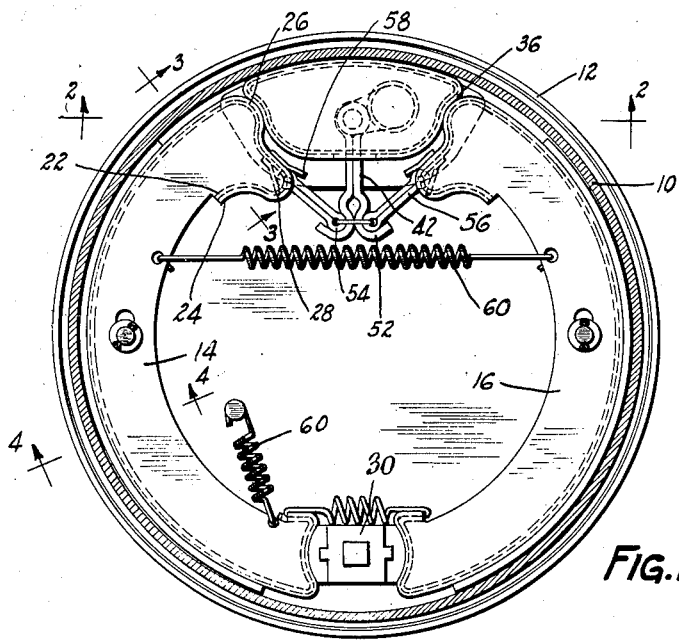
Figure 1 is a vertical section through the brake taken just inside the head of the drum disclosing the novel brake shoes, together with the novel anchoring and operating structure therefor.
Figure 2:
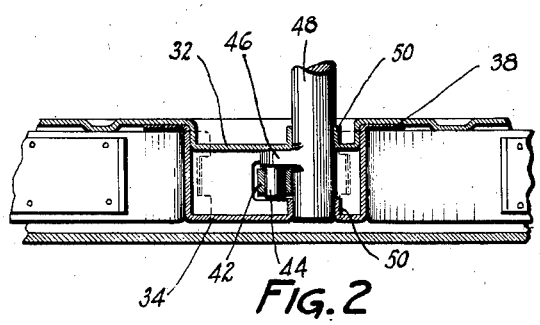
Figure 2 is a partial section taken on the line 2—2 of Figure 1 disclosing in more detail the novel anchor and shoe construction.
Figure 3:
Figure 5:
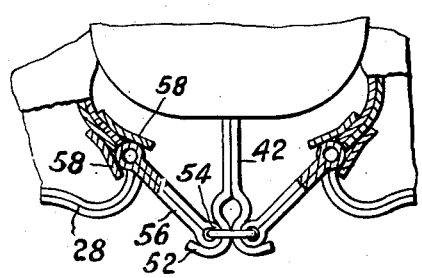
Figure 4:
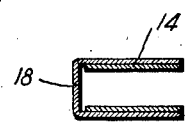

Figures 3 and 4 are sections taken respectively on the lines 3—3 and 4—4 of Figure 1 disclosing the novel shoe construction at the end and center thereof; and Figure 5 is an enlarged detail view of the operating structure, parts being broken away to disclose the relation of the parts to each other.

The illustrated embodiment of the invention includes a rotatable drum 10, at the open side of which is a support such as a backing plate 12, and within which is the friction means of the brake. The friction means preferably includes two novel interchangeable stamped steel brake shoes 14 and 16, each preferably fabricated from telescoping channel sectioned stampings 18 and 20 as disclosed in Figure 3. The bottom flanges are cut away throughout the major portion of the length of the shoe, leaving the nesting L sectioned portions disclosed in Figure 4. The ends of each shoe remain intact providing a box configuration and are further characterized at one end by nesting end flanges 22 and 24 curved outwardly at 26 and downwardly at 28 for a purpose hereinafter described.

The lower ends of the shoes are pivotally connected by a novel floating adjustable wedge joint 30 more completely disclosed and described in the application of Ludger E. La Brie No. 285,289, filed June 14, 1928.

According to an important feature of our invention, we provide a novel anchoring abutment for the floating friction means so arranged between the ends of the same as to permit a selective anchoring depending upon the direction of drum movement. In that embodiment of our invention disclosed we preferably provide a novel abutment 32 by embossing the pressed steel backing plate 12 into the drum during its process of manufacture. Telescoping over this embossment we may provide a cup-shaped pressed steel anchor member 34 generally trapezoidal in outline, as indicated in Figure 1, and curved inwardly in its short sides at 36 to accommodate the rounded anchoring portion 26 of each brake shoe. Three of the sides of the stamping are preferably flared outwardly at 38 to contact the face of the backing plate.

The lower portion of the anchor member is preferably slotted to accommodate the vertical link 42 of a toggle operating mechanism generally similar to that disclosed in Figure 27 of the application of Ludger E. La Brie, Serial No. 261,068, filed March 12, 1928, the upper end of the link being pivotally connected to a pin 44 at one end of a crank arm 46 projecting from a shaft 48 having its bearing in inwardly extending projections 50 in the parts of the anchor. Link 42 may simulate a cotter pin being bent around the pin 44 and hooked at its ends 52 to receive the rounded ends 54 of thrust links 56. Links 56 may be rounded at their other ends to nest within a recess formed by spaced plates 58 fixed to the curved portion 28 of the end of each shoe and a slotted portion in said end.

In operation actuation of the toggle links functions to lift the two shoes bodily against the drum, this action being insured by making the return spring 60 strong enough to resist the spreading of the shoes during this phase of the operation. Once in drum engagement one or the other of the shoes remains anchored against my novel anchor, this by virtue of the drum friction and continued spreading of the toggle then serves to adequately apply the brake to retard the car.

While but one embodiment of our invention has been described and disclosed in detail, it is not our intention to limit the scope of the invention to that particular embodiment or otherwise than by the terms and scope of the appended claims.

We claim:

1. A brake comprising, in combination, a drum, a backing plate, friction means within the drum and having one part which anchors when the drum is turning in one direction and a different part which anchors when the drum is turning in the other direction, and a raised portion stamped on the backing plate to directly take the torque from said parts.

2. A brake comprising, in combination, a drum, friction means within the drum and having one part which anchors when the drum is turning in one direction and a different part which anchors when the drum is turning in the other direction, a backing plate closing the open side of the drum and having a portion projecting inside of the drum, and a stamping constructed and arranged to fit over the backing plate projection and to take the braking torque from said parts.

3. A brake comprising, in combination, a drum, friction means within the drum and having one part which anchors when the drum is turning in one direction and a different part which anchors when the drum is turning in the other direction, a backing plate closing the open side of the drum and having a portion projecting inside of the drum, and a cup-shaped stamping constructed and arranged to fit over the backing plate projection and to take the braking torque from said parts.

4. A brake comprising a backing plate, a raised portion stamped in the backing plate providing an anchor abutment in combination with friction means adapted to anchor thereon with either direction of drum rotation.

5. A brake, comprising, in combination, a drum, friction means within the drum, a backing plate closing the open side of the drum and having a generally rectangularly shaped embossed projection at one side thereof, together with a correspondingly shaped anchor member telescopingly fitted over said projection.

6. A brake, comprising, a backing plate having a generally rectangularly shaped embossed projection at one side thereof, together with a correspondingly shaped anchor member telescopingly fitted over said projection.

7. A brake, comprising, in combination, a drum, friction means within the drum having rounded ends, a backing plate closing the open side of the drum, a raised portion on the backing plate and a member slipped over the raised portion having recesses accommodating the rounded ends of the friction means.

8. A brake, comprising, in combination, a pair of channel-shaped shoes, each end of a pair of juxtaposed ends thereof having a rounded portion and a slot therein, together with operating means comprising thrust links, each link having a spread apart end seated within one of the aforementioned slots.

9. A brake comprising, in combination, a drum, friction means within the drum characterized by telescoped U-shaped stampings forming brake shoes, each shoe being cut away at the base thereof throughout a substantial portion of its length to provide nested L-sectioned portions of the shoe.

10. A brake comprising, in combination, a drum, friction means within said drum having spaced apart ends, each end provided with a slot bounded by spaced plates, together with an operating mechanism comprising links having rounded ends nesting within said slots and confined by said plates.

11. A brake comprising, in combination, a drum, friction means within the drum and having one part which anchors when the drum is turning in one direction and a different part which anchors when the drum is turning in the other direction, a cup-shaped stamping arranged within the drum to directly take the torque from said parts and applying means for the brake partly lying within said stamping.

12. A brake comprising a backing plate, a raised portion on the plate and a trapezoidal member fitted on the raised portion having at least two of its faces curved.

13. A brake comprising a backing plate, a raised portion on the backing plate, a member telescoping the raised portion and a shaft positioned for rotation in the raised portion and member.

14. A brake comprising a backing plate, a raised portion on the backing plate and a member telescoping the raised portion having oppositely disposed inwardly curved faces.

15. A brake comprising a backing plate, a raised portion on the plate, a member telescoping the raised portion having oppositely disposed bearing surfaces, friction elements mounted for movement on the plate and adapting to abut the bearing surfaces, a floating connection between the friction elements and operating means for the friction elements positioned for rotation in the raised portion and telescoping member.

16. A brake comprising friction members having adjacent ends spaced from each other, each end being provided with a slot bounded by spaced plates, and operating means including a link having hooked ends to provide a recess on either side of said link, together with thrust links, each having a rounded end fitting within one of said recesses and having another end seated within one of said slots and confined by one of said plates.

In testimony whereof, we have hereunto signed our names.

CECIL H. TAYLOR.
LUDGER E. LA BRIE.